US006871861B2

(12) United States Patent
Hernandez, Jr.

(10) Patent No.: US 6,871,861 B2
(45) Date of Patent: Mar. 29, 2005

(54) FOLDABLE CREEPER

(75) Inventor: Hector R. Hernandez, Jr., Fullerton, CA (US)

(73) Assignee: AllTrade Tools LLC, Long Beach, CA (US)

(*) Notice: Subject to any disclaimer, the term of this patent is extended or adjusted under 35 U.S.C. 154(b) by 0 days.

(21) Appl. No.: 10/266,557

(22) Filed: Oct. 8, 2002

(65) Prior Publication Data

US 2004/0066020 A1 Apr. 8, 2004

(51) Int. Cl.[7] .......................... B25H 5/00; A01D 67/04; A47C 4/00; A47C 17/64; A47K 1/04

(52) U.S. Cl. ..................... 280/32.6; 280/32.5; 280/639; 280/79.11; 280/35; 297/16.1; 5/114; 248/129

(58) Field of Search ............................... 280/32.6, 32.5, 280/30, 35, 37, 639, 640, 641, 651, 79.11; 297/16, 45, 16.1; 403/102; 5/114, 116, 201, 282.1; 248/129

(56) References Cited

U.S. PATENT DOCUMENTS 747,822 A 12/1903 Wilson
781,243 A * 1/1905 Thompson .................. 280/651
1,072,052 A 9/1913 Stoehr
1,098,262 A 5/1914 Hollingshead
1,195,014 A 8/1916 Hild
1,209,447 A 12/1916 Johnson
1,226,585 A 5/1917 Burns
1,248,839 A 12/1917 Fravel
1,302,301 A 4/1919 Broome
1,394,493 A 10/1921 Grazer
1,643,268 A 9/1927 Burnwatt
1,668,379 A 5/1928 Radvanyi
1,769,548 A 7/1930 Rodin
2,051,563 A 8/1936 Mance
2,104,372 A 1/1938 Matthies
2,168,455 A 8/1939 Smith
2,487,706 A 11/1949 Happ
2,611,417 A 9/1952 Henry et al.
2,692,636 A 10/1954 Morrison
3,099,356 A 7/1963 Burnett
3,215,096 A 11/1965 Holtz
3,400,942 A 9/1968 Hull
3,602,160 A 8/1971 Heal
3,677,569 A 7/1972 Larson
3,984,116 A 10/1976 Bowers
4,369,987 A 1/1983 Witherell
D270,962 S 10/1983 Martell (Continued)

FOREIGN PATENT DOCUMENTS

FR 658394 6/1928

*Primary Examiner*—Christopher P. Ellis
*Assistant Examiner*—G B Klebe
(74) *Attorney, Agent, or Firm*—John J. Connors; Connors & Assoc. Inc.

(57) ABSTRACT

A foldable creeper is disclosed that has a rolling mechanism coupled to connectors that couple a seat support and back support. A locking mechanism may be provided that retains the creeper in an open position.

6 Claims, 7 Drawing Sheets

U.S. PATENT DOCUMENTS

| | | | | |
|---|---|---|---|---|
| 4,471,969 | A | | 9/1984 | Zabala et al. |
| 4,544,203 | A | | 10/1985 | Younger et al. |
| 4,580,799 | A | | 4/1986 | Quinonez |
| 4,705,247 | A | | 11/1987 | Delmerico |
| 4,889,352 | A | | 12/1989 | Chamberlin, Jr. et al. |
| 4,895,380 | A | | 1/1990 | Brooks et al. |
| 4,957,302 | A | | 9/1990 | Maxwell |
| 5,044,690 | A | | 9/1991 | Torrey |
| 5,108,118 | A | | 4/1992 | Schaevitz |
| 5,174,592 | A | | 12/1992 | Pool |
| 5,297,809 | A | | 3/1994 | Chen |
| 5,330,209 | A | | 7/1994 | Pool |
| 5,451,068 | A | | 9/1995 | Shockley |
| 5,494,305 | A | * | 2/1996 | Chen ......................... 280/32.6 |
| 5,611,552 | A | | 3/1997 | Miles et al. |
| RE35,732 | E | | 2/1998 | Shockley |
| 5,730,449 | A | * | 3/1998 | Miles ........................ 280/32.6 |
| 5,883,053 | A | | 3/1999 | Tudor |
| 5,895,062 | A | * | 4/1999 | Miles et al. ............... 280/32.6 |
| 5,947,489 | A | | 9/1999 | Tucker |
| 6,059,298 | A | | 5/2000 | Tucker |
| 6,095,532 | A | * | 8/2000 | Martin ...................... 280/32.6 |

* cited by examiner

FOLDABLE CREEPER

BACKGROUND OF INVENTION

A mechanic is often required to work on the underside of an automobile to perform maintenance such as changing the oil. It has been known to use devices called creepers that include a platform with a flat surface mounted on wheels. A creeper enables the mechanic to lie in a supine position while working underneath the automobile. Improved creepers are capable of folding, thus allowing the creeper to be stored in a compact form. Ideally, a foldable creeper is foldable at approximately its midsection, thereby providing a compact, substantially rectangular structure when folded into the closed position. Typical foldable creepers are disclosed in U.S. Pat. No. 5,611,552 and U.S. Pat. No. 5,947,489.

SUMMARY OF INVENTION

This invention has several features that are summarized in the CLAIMS. These features provide this invention with its many desirable attributes. After reading the following section entitled "DETAILED DESCRIPTION," one will understand how the features of this invention provide its benefits, which include, but are not limited to, a creeper that is convenient to fold and is compact when folded, is capable of being locked in position when unfolded, and has enhanced rigidity and strength.

Broadly, the foldable creeper of this invention is capable of supporting a person in a supine position. It includes a seat support and back support connected by a connector including a lower surface, a first end, a second end, and at least one caster coupled to the lower surface. The seat support comprises a base side, an inner end, and at least one caster disposed on the base side. The back support comprises a base side, an inner end, and at least one caster disposed on the base side. A first end of the connector is coupled by a hinge to the seat support at or near said inner end of the seat support, and the second end of the connector is coupled by a hinge to the back support at or near the inner end of said back support. The connector enables the back support and seat support to be manually moveable between an open position and a closed position.

In the open position, the seat support and the back support are substantially coplanar. In the closed position, the seat support and the back support are substantially in parallel planes. The casters are disposed between the seat support and the back support when the creeper is in the closed position. Support sides of the seat and supports face away from each other when the creeper is in the closed position. The seat and back supports each include spaced apart parallel rail members supporting cushions. The inner ends of the rail members bend inward and a connector with an associated caster has its opposed ends each attached by a hinge respectively to the seat support and the back support. The inwardly bent ends of the rails enhance the strength of the seat and back supports. Typically, there are pairs of casters attached to each of the outer ends of the seat and back supports.

In a preferred embodiment, there are six casters employed. The seat support has a pair of spaced apart first and second sides. The first caster is disposed substantially near the first side of the seat support and the second caster is disposed substantially near the second side of the seat support. The back support has a pair of spaced apart first and second sides. The third caster is disposed substantially near the first side of the back support and the fourth caster is disposed substantially near the second side of the back support. The fifth caster is coupled to, one of the connectors, and the sixth caster is coupled to the other of the connectors. The sides of the seat support and back support each have indented inner ends so that the casters connected to the hinged connectors are disposed inward of the casters coupled to the seat and back supports. Thus, the casters on the hinged connectors are not aligned with the casters on the seat support and back support.

Preferably, the foldable creeper includes a locking mechanism that retains the seat support and the back support substantially coplanar when the creeper is in the open position. This locking mechanism includes a first lock attached to the first connector and a second lock attached to the second connector. These first and second locks each have a lock position that retains the seat support and the back support coplanar when the creeper is in an open position and an unlock position that enables the seat support and the back support to be manually moved into the closed position. Each first and second lock comprises a plate member that is fastened to a connector in a manner enabling the plate member to be loosened and tightened. When the plate member is tightened and in the locked position the plate overlaps the inner ends of the seat support and the back support to maintain the seat support and the back support coplanar. When the plate member is loosened and rotated, the seat support and the back support are enabled to be manually moved into substantially parallel planes.

Optionally, the creeper of this invention may include an adjustable headrest near an outer edge of the back support. The headrest comprises a head support member that is capable of supporting the weight of a human head and an adjustor that is capable of adjusting the height and the angle of inclination of the head support member relative to the back support.

DESCRIPTION OF DRAWINGS

The preferred embodiment of this invention, illustrating all its features, will now be discussed in detail. This embodiment depicts the novel and non-obvious foldable creeper of this invention as shown in the accompanying drawings, which are for illustrative purposes only. These drawings includes the following figures (FIGS.), with like numerals indicating like parts.

DETAILED DESCRIPTION

Figure 1:
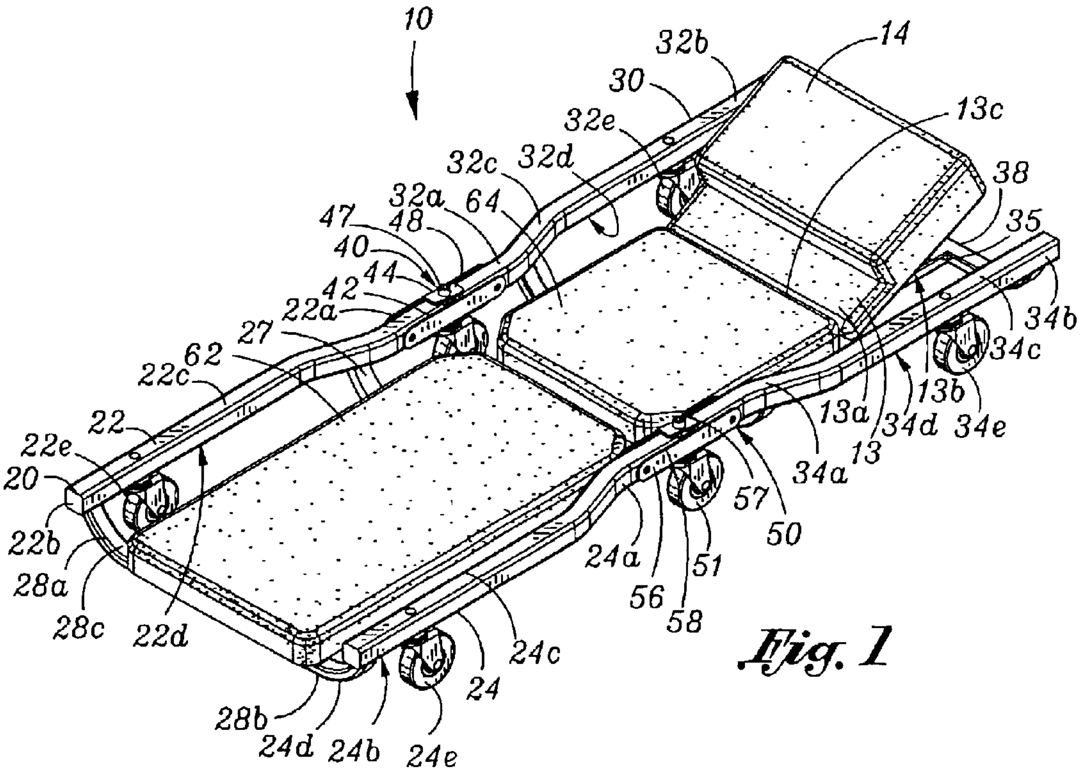
FIG. 1 is a perspective view of the creeper of this invention showing the support sides of the back support and seat support.
Figure 2:
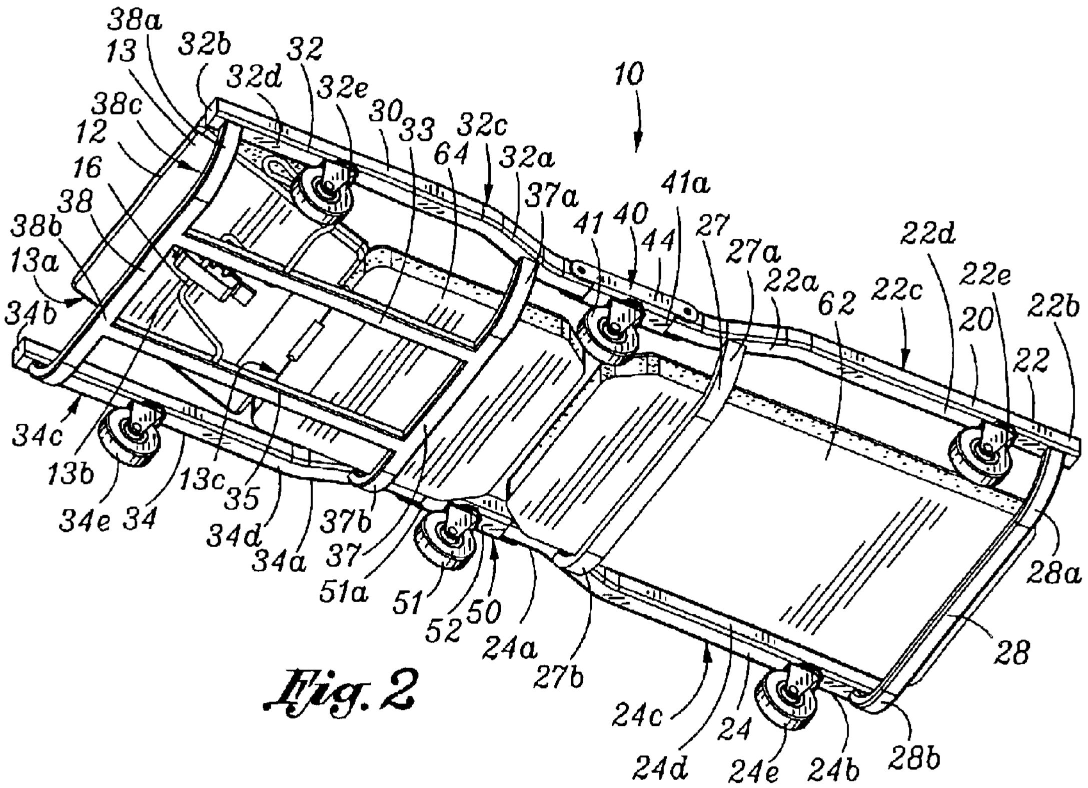
FIG. 2 is a perspective view of the creeper shown in FIG. 1 illustrating the base side of the back support and seat support.
Figure 3:
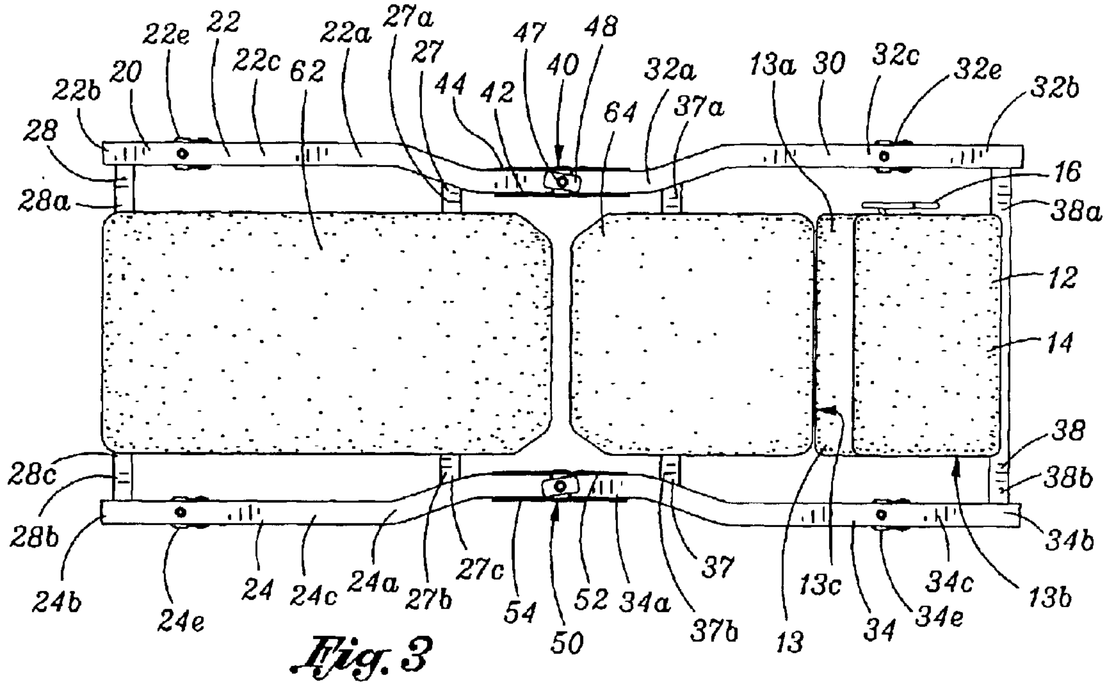
FIG. 3 is plan view of the support side of the creeper shown in FIG. 1.
Figure 4:
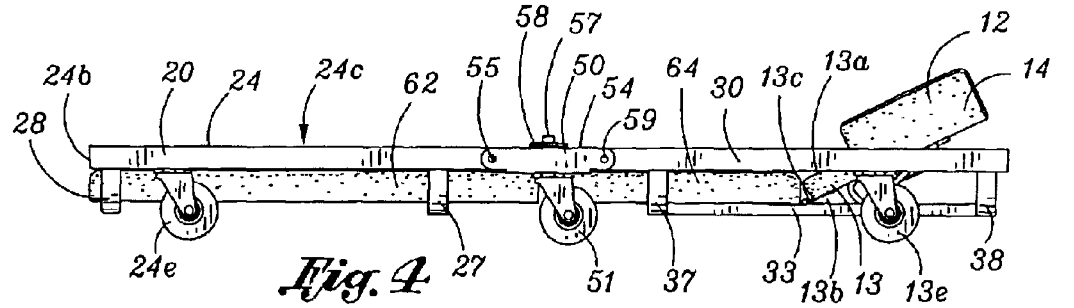
FIG. 4 is a side view of the creeper shown in FIG. 1.
Figure 5:
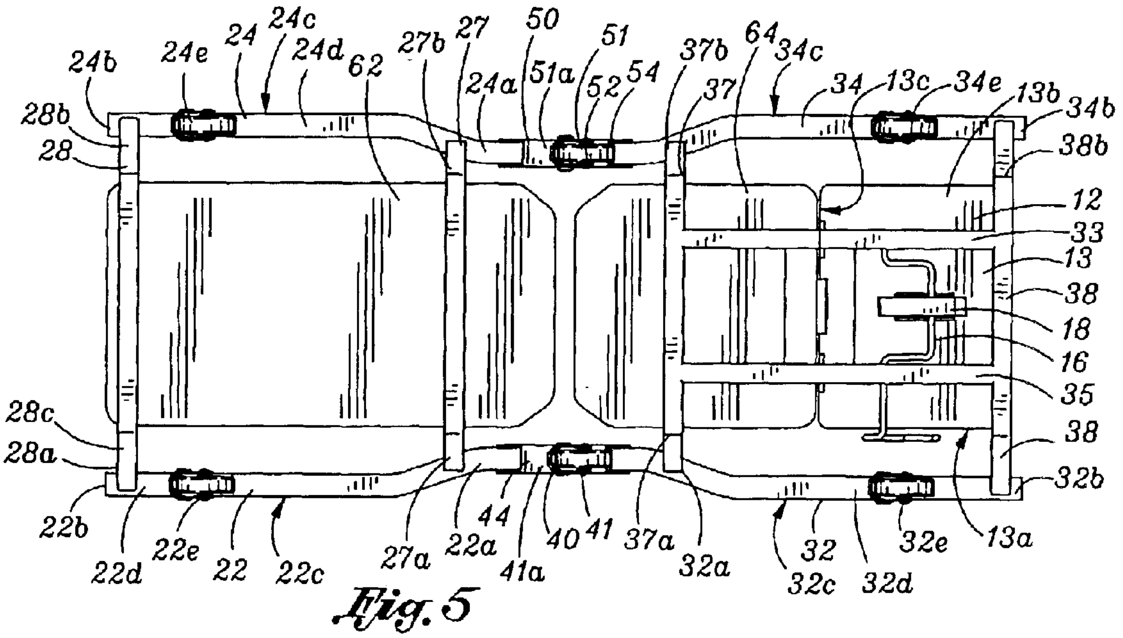
FIG. 5 is a plan view of the base side of the creeper shown in FIG. 1.
Figure 6:
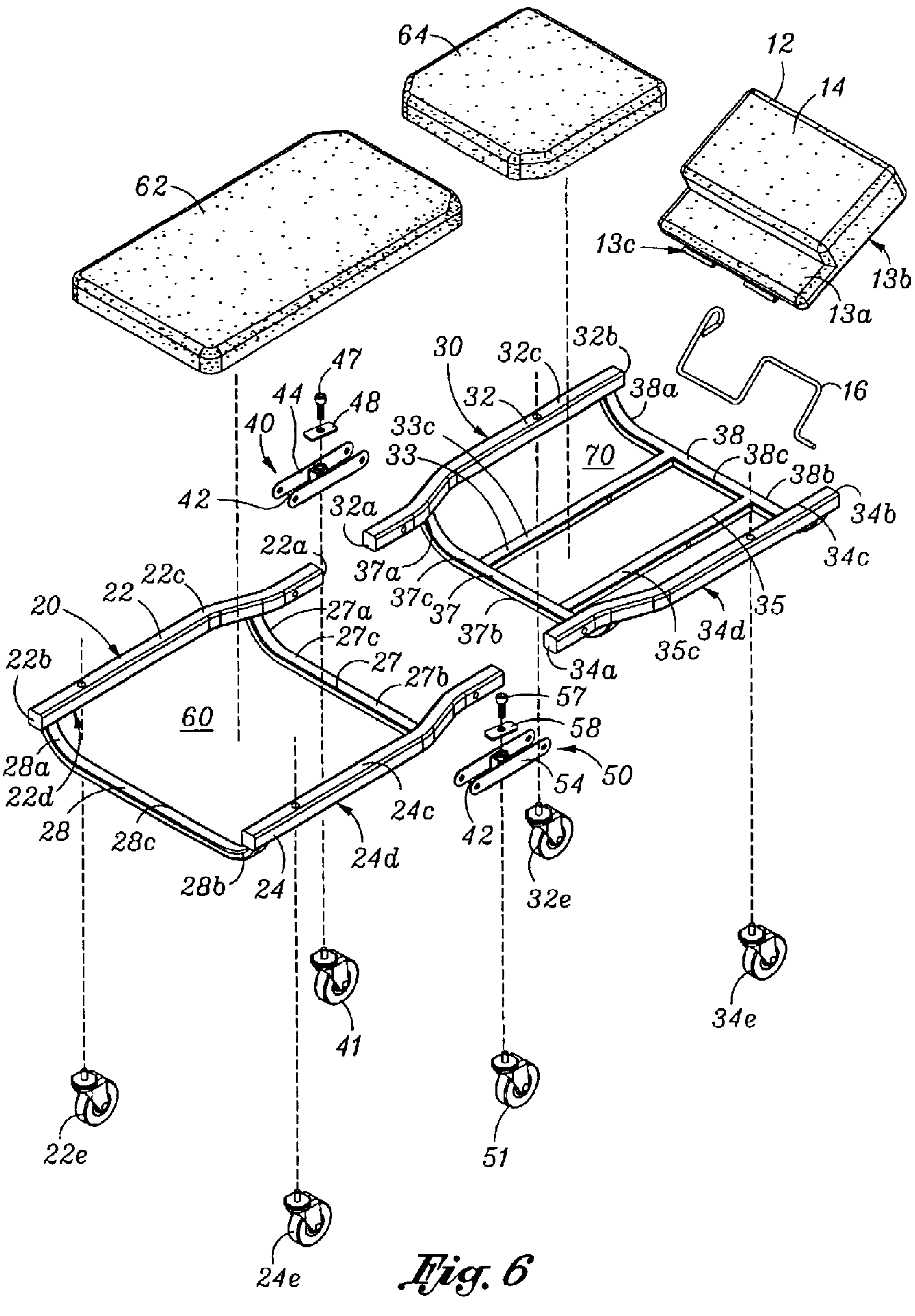
FIG. 6 is an exploded perspective view of the creeper shown in FIG. 1.

As best shown in FIGS. 1–6, the creeper 10 generally comprises a seat support 20, a back support 30, a first connector 40 and a second connector 50. The seat support 20 comprises a pair of longitudinal rail members 22, 24 and a pair of lateral connecting rail members 27, 28 that connect the longitudinal rail members 22, 24. The longitudinal rail members 22, 24 each have inner ends 22*a*, 24*a*, outer ends, 22*b*, 24*b*, top sides 22*c*, 24*c*, and bottom sides 22*d*, 24*d*, respectively. The cross-section section of the longitudinal rail members 22, 24 is typically rectangular, but may include other shapes, such as, circular, oval and square.

Each of the lateral rail members 27, 28 has a top side 27*c*, 28*c* and a pair of ends 27*a*, 27*b*, and 28*a* and 28*b*, respectively. The ends 27*a*, 27*b*, and 28*a* and 28*b*, respectively of the lateral rail 27, 28 members may be curved to form a channel 60 between the outer longitudinal rail members 22, 24. The cross-section of the lateral rail members is typically rectangular, but may be other shapes, such as, circular, oval and square. A cushion 62 is on the top sides 27*c*, 28*c* of the lateral rail members 27, 28, and lies within channel 60. A pair of caster wheels 22*e* and 24*e* are each coupled to an outer end of each one of the longitudinal rail members 22, 24, respectively.

The back support 30 comprises a pair of outer longitudinal rail members 32, 34, a pair of inner longitudinal rail members 33, 35, and a pair of lateral connecting rail members 37, 38 that connect the longitudinal rail members 32, 34. The longitudinal rail members 32, 24 each have inner ends 32*a*, 34*a* and outer ends, 32*b*, 34*b*, top sides 32*c*, 34*c*, and bottom sides 32*d*, 34*d*, respectively. The inner longitudinal rail members 33, 35 each have top sides 33*c*, and 35*c*, respectively. The cross-section of the longitudinal rail members 32, 33, 34, 35 is typically rectangular, but may include other shapes, such as, circular, oval and square.

Each of the lateral rail members 37, 38 has a top side 37*c*, 38*c* and a pair of ends 37*a*, 37*b*, and 38*a* and 38*b*, respectively. The ends 37*a*, 37*b*, and 38*a* and 38*b*, respectively of the lateral rail members 37, 38 may be curved to form a channel 70 between the outer longitudinal rail members 32, 34. The cross-section of the lateral rail 37, 38 members is typically rectangular, but may be other shapes, such as, circular, oval and square. A cushion 64 is positioned on the top side 37*c*, 38*c*, 33*c*, 35*c* of the lateral rail members 37, 38, and inner longitudinal rail members 33, 35, respectively. A pair of caster wheels 32*e* and 34*e* is at each outer end coupled to each one of the longitudinal rail members 32, 34, respectively.

Figure 8:
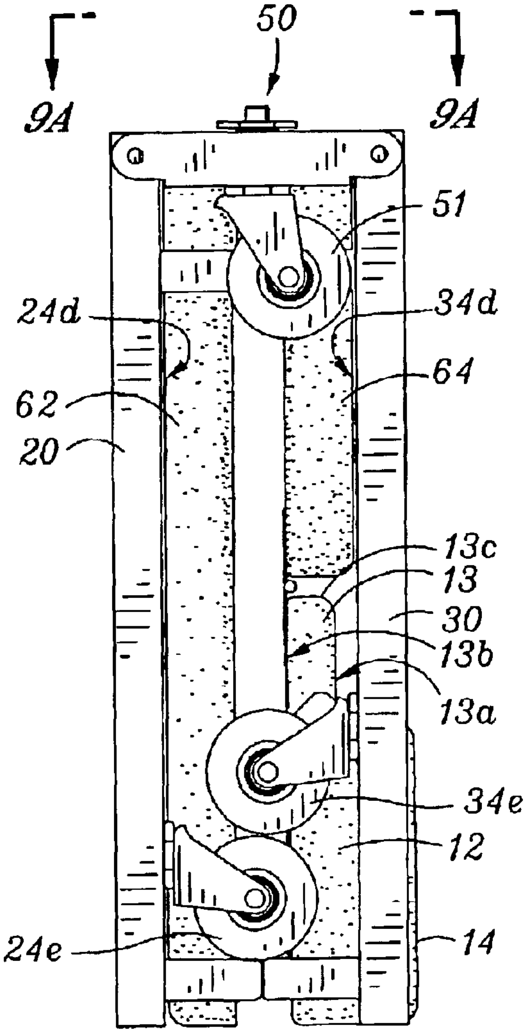
FIG. 8 is side view of the creeper shown in FIG. 1 in a closed position.
Figure 9A:
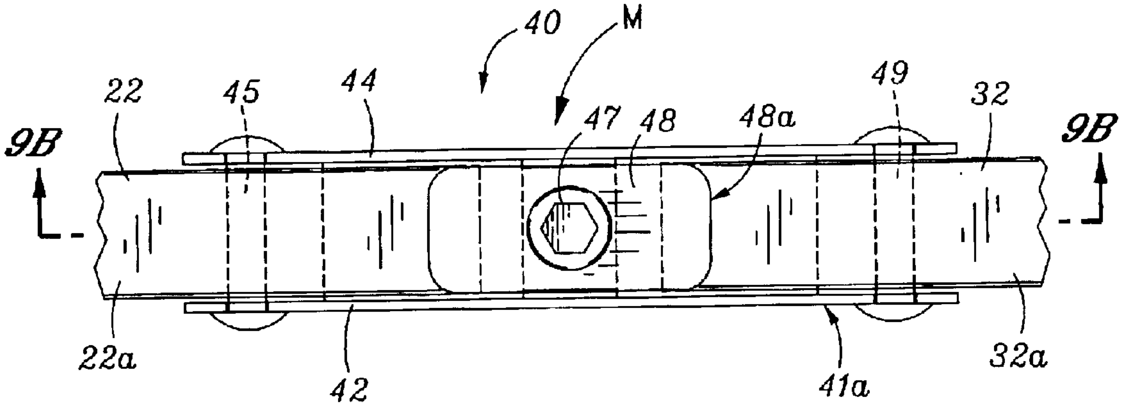
FIG. 9A is a plan view taken along line 9A—9A of FIG. 8, showing a lock in a locked position.
Figure 9B:
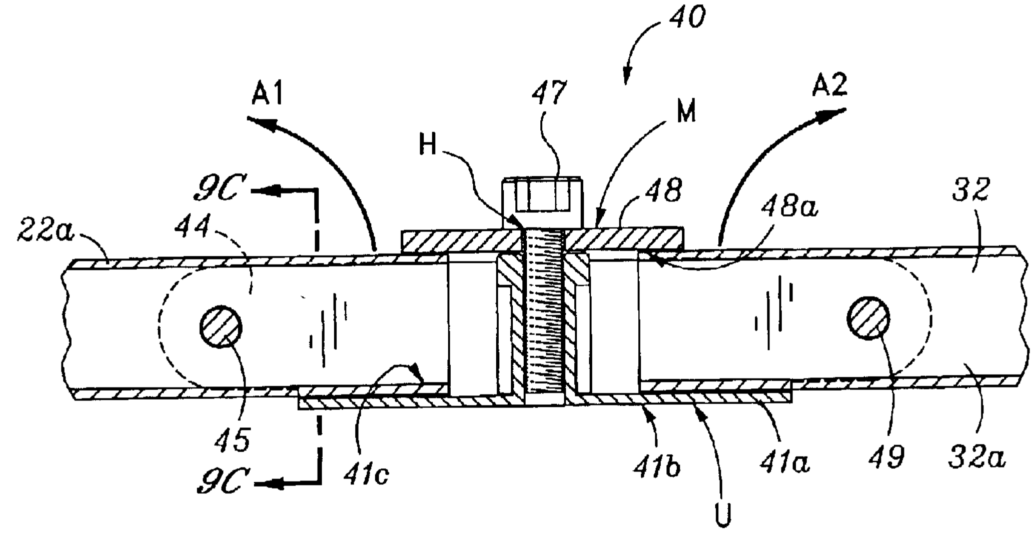
FIG. 9B is a cross-sectional view taken along line 9B—9B of FIG. 9A.
Figure 9C:
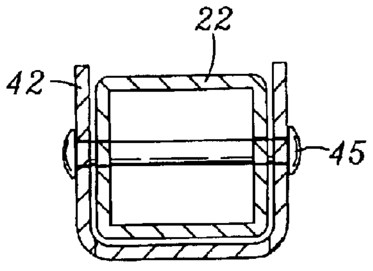
FIG. 9C is a cross-sectional view taken along line 9C—9C of FIG. 9B.

FIGS. 6, 9A, 9B, 10A and 10B illustrate the connectors 40 and 50 that connect the back support 20 to the seat support 30 and allows the creeper 10 to move between an open position as shown in FIG. 1 and closed position shown in FIG. 8. These connectors 40 and 50 each have one end hingedly coupled to the seat support 20 at or near an inner end of the seat support and another end hingedly coupled to the back support 30 at or near an inner end of the back support. Consequently, the back support 30 and seat support 20 are manually moveable between the open position and the closed position.

As best illustrated in FIGS. 9B, 9C, 10B and 10C, each connector 40, 50 comprises an elongated U-shaped hinge member U with bolts 45 and 49 at or near opposed ends of this U-shaped member. The U-shaped member U has a base 41*a* with an upper surface 41*c*, a lower surface 41*b*, a pair of sidewalls 42, 44 that extend from the upper surface 41*c* of the base 41*a*. The sidewalls 42, 44 extend beyond the length of the base 41*a*. Longitudinal rail members 22, 24 on the seat support 20 are coupled to connectors 40 and 50 by passing bolts 45 and 49 through the longitudinal rail members 22, 24 at ends 22*a* and 24*a*, respectively. Longitudinal rail members 32, 34 on the back support 30 are coupled to connectors 40 and 50 by passing bolts 49 through longitudinal rail members 32, 34 at ends 32*a* and 34*a*, respectively. The manner of attaching the connectors 40 and 50 with the bolts 49 to the rail members 32, 34 creates hinges attaching the seat support 20 and the back support 30 to enable them to be folded together as shown in FIG. 8.

Figure 10A:
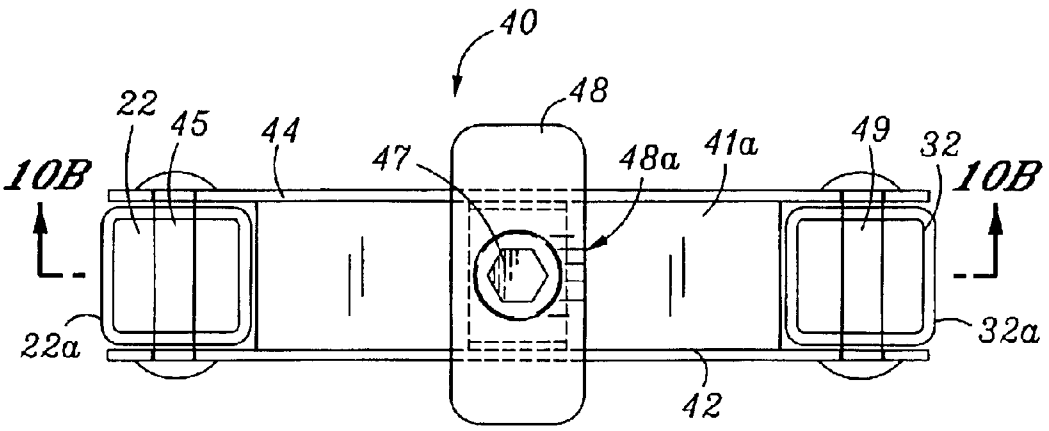
FIG. 10A is a plan view depicting the lock shown in FIG. 9A in an unlocked position.
Figure 10B:
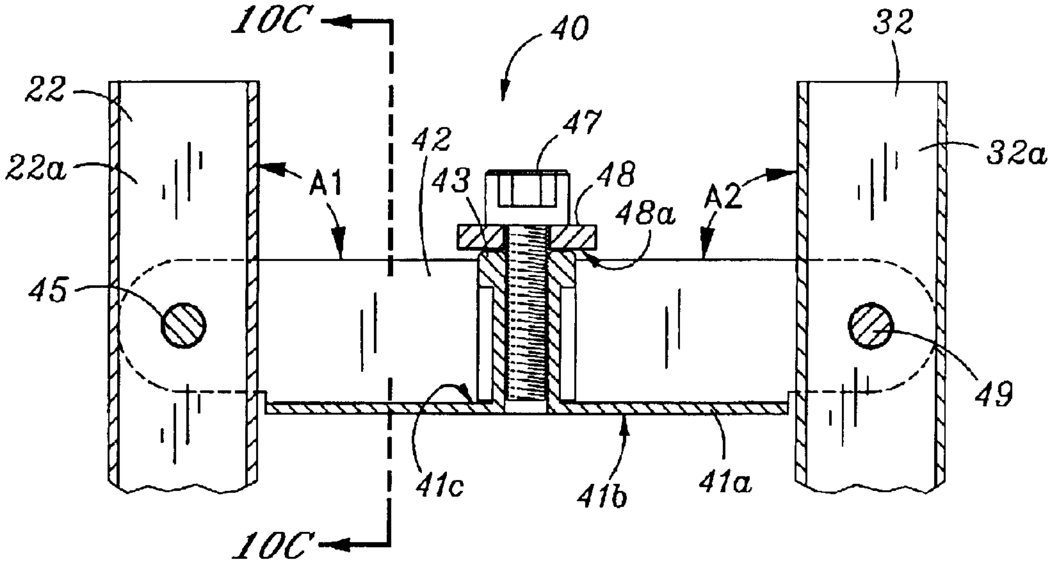
FIG. 10B is a cross-sectional view taken along line 10B—10B of FIG. 10A.
Figure 10C:
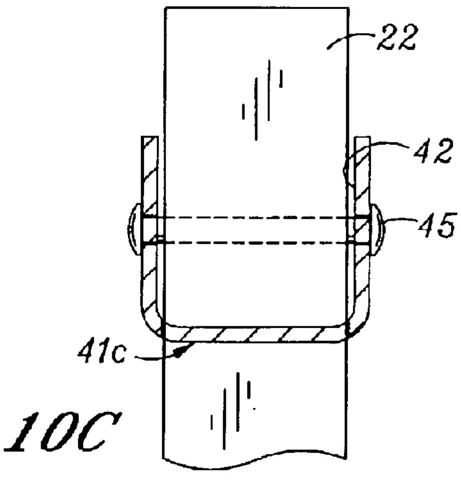
FIG. 10C is a cross-sectional view taken along line 10C—10C of FIG. 10B.

As best shown in FIGS. 6, 9A, 9B, 10A and 10B, the first connector 40 and second connector 50 preferably each include a locking mechanism M. This locking mechanism M comprises a threaded locking pin 47 screwed into a cylindrical receptacle 43 with internal threads. The cylindrical receptacle 43 is integral with the base 41*a* of the U-shaped member U. The locking pin 47 extends through a hole H in the locking plate 48 into the receptacle 43. As shown in 9A and 9B, the locking mechanisms M retains the seat support 20 and the back support 30 in a coplanar position when the mechanism is in a locked position. When the creeper 10 is locked in the open position, inner ends 22*a*, 24*a*, 32*a*, and 34*a* of longitudinal rails 22, 24, 32, and 34 are disposed between the lower surfaces 48*a* of plates 48 and the upper surfaces 41*c* and 51*c* of bases 41*a* of connectors 40 and 50, and pins 47 are fastened such that plates 48 are in contact with, and press snugly against, longitudinal rail members 22, 24, 32, and 34. As shown in FIGS. 10A and 10B, and using connector 40 for purposes of illustration, in an unlocked position, pins 47 are loosened, allowing the locking plates 48 to be rotated such that they are not disposed over longitudinal rail members 22, 24, 32, and 34. While in the unlocked position, the seat support 20 and the back support 30 are rotatable into the closed position shown in FIG. 8.

Figure 7:
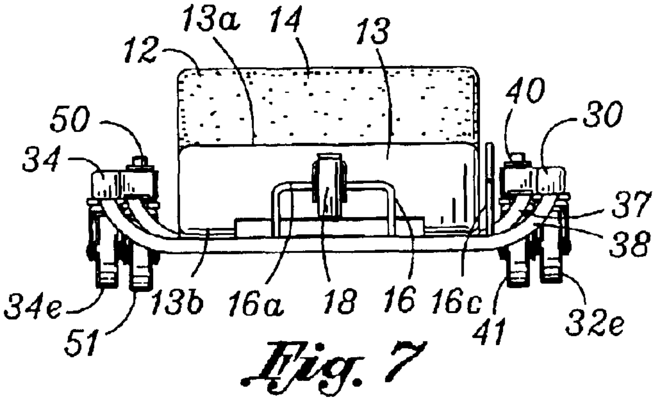
FIG. 7 is an end view of the back support of the creeper shown in FIG. 1.
Figure 11:
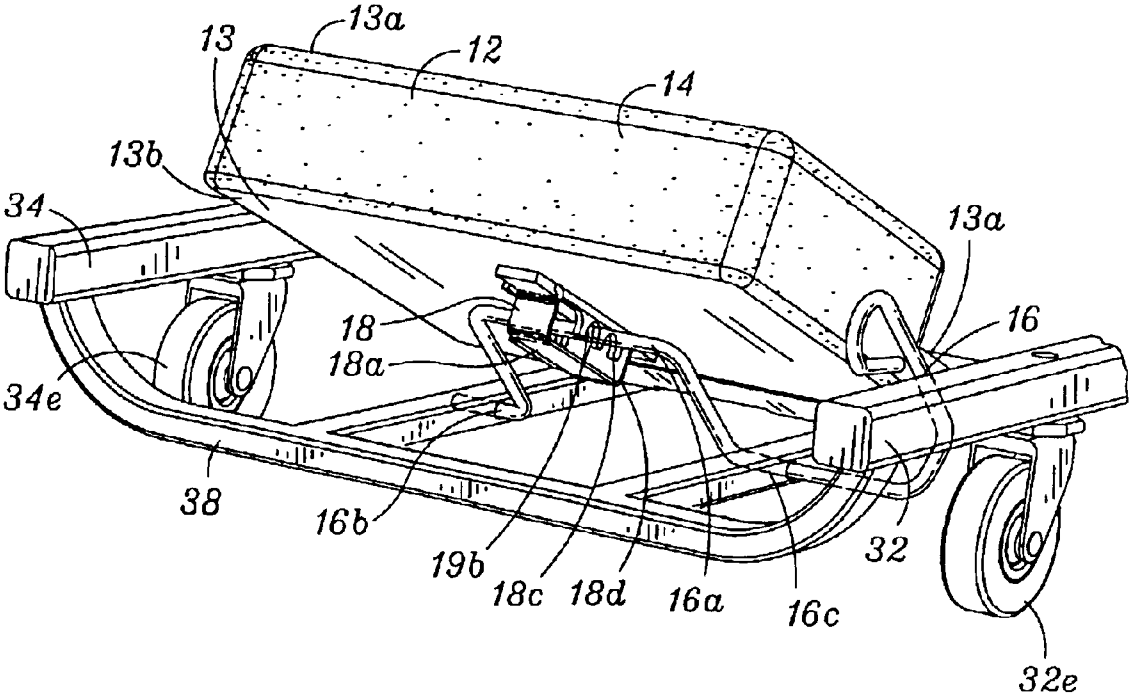
FIG. 11 is perspective view of the head support in a raised position.

As best shown in FIGS. 7 and 11, in one aspect of the invention, a head support 12 is coupled to the back support 30. The head support 12 comprises a backing member 13, a cushion 14, a slotted adjuster 18 and an adjusting rod 16. The backing member 13 is typically a flat rectangular piece of wood or metal having a cushion side 13*a* and an adjustor side 13*b*. The backing member 13 has an inner end 13*c* that is coupled by hinges (not shown) to the backing support 30. The cushion 12 is coupled to the backing member 13 on the cushion side 13*a*, while the slotted adjustor 18 is coupled to the adjuster side 13*b*. The slotted adjuster 18 comprises a series of slots 18*a*, 18*b* and 18*c* enclosed by a retainer 18*d*. The adjusting rod 16 has a U-shaped portion 16*a*, an extended portion 16*b* and a turning portion 16*c*. The U-shaped portion 16*a* is disposed between the series of slots 18*a*, 18*b* and 18*c* and the retainer 18*d*, while the extended portion 16*b* and the turning portion 16*c* are coupled to inner longitudinal rail members 35 and 33, respectively. The height and angle of inclination of the head support 12 is adjusted by inserting the U-shaped portion 16a of the adjusting rod 16 into one of the slots 18*a*, 18*b* and 18*c*.

When the creeper 10 is in the open position as shown in FIG. 1, the back support 30 and the seat support 20 are substantially coplanar. Referring to FIGS. 8, 9A, 9B and 10B, when the creeper 10 is in a closed position, the back support 30 lies in a plane substantially parallel to the seat support 20. The creeper 10 is moved from an open position to a closed position by rotating the back support 30 in an arc $A_2$ (FIG. 10B) about the hinged connection at bolts 49 and 59 at substantially ninety degrees from the open position, and rotating the seat support 20 in an arc $A_1$ (FIG. 10B) about the hinged connection at bolts 45 and 55 about ninety degrees.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A folding creeper comprising:

a first unit including a wheel side, a pair of opposed sides, and at least two caster wheels coupled to said wheel side;

a second unit comprising a wheel side, a pair of opposed sides, and at least two caster wheels coupled to said wheel side, a hinge member including at least one caster, said hinge member connecting said first unit and second unit enabling the first unit and second unit to be manually moved between an open position and a closed position;

one caster wheel coupled to said first unit being substantially aligned with one caster wheel coupled to said second unit, and said caster wheel coupled to said hinge member being non-aligned with said aligned wheels coupled to said first unit and said second unit a lock that retains said first unit and said second unit coplanar when the creeper is in the open position, where said lock comprises:

a plate member with a hole disposed there through and including a post element having a first end and a second end that projects through the plate member; and a fastener connected to the second end of the post element that upon being unfastened allows the plate member to be manually rotated and upon fastening prevents the plate member from being rotated.

2. A foldable creeper that is capable of supporting a person comprising:

a seat support including a base side, an inner end, and at least one caster disposed on said base side;

a back support including a base side, an inner end, and at least one caster disposed on said base side; and a first connector and a second connector, each connector including a lower surface, a first end, a second end, and at least one caster coupled to said lower surface;

said first ends of each of said first and second connectors being hingedly coupled to said seat support at or near said inner end of said seat support, and said second ends of each of said first and second connectors being hingedly coupled to said back support at or near said inner end of said back support, whereby the back support and seat support are manually moveable between an open position and a closed position, a first lock is attached to the first connector and a second lock attached to the second connector, said first and second locks each having a lock position that retains said seat support and said back support coplanar when the creeper is in an open position and an unlock position that enables said seat support and said back support to be manually moved into a closed position, where each of said first lock and second lock comprises:

a plate member that is fastened to the connector in a manner enabling said plate member to be loosened and tightened, when said plate member is tightened and in the locked position, said plate overlaps the inner ends of the seat support and the back support to maintain the seat support and the back support coplanar, and when said plate member is loosened and rotated, the seat support and the back support are enabled to be manually moved into substantially parallel planes.

3. A foldable creeper that is capable of supporting a person comprising:

a back support including a pair of spaced apart, longitudinally oriented, opposed rail members that are coupled together, each of said rail members having an inner end and an outer end, a bottom surface, a top side, a caster coupled to each of said bottom surfaces of said longitudinal rail members at the outer end and no casters attached to said inner end, and a cushion member;

a seat support including a pair of spaced apart longitudinally oriented, opposed rail members that are coupled together, each of said rail members having an inner end and an outer end, a bottom surface, a caster coupled to each of said bottom surfaces at the outer end and no casters attached to said inner end, and a cushion member; and a connector that attaches the seat support and back support together, said connector including, a pair of U-shaped hinge members, each U-shaped hinge member including, a base having an upper surface, a lower surface, and a pair of opposed ends, a caster attached to the lower surface, a pair of sidewalls that extend from the upper surface of the base, and beyond the opposed ends of said base, and a pair of hinges, each hinge extending between said sidewalls nearby each one of said opposed ends, each of said inner ends of said longitudinal rail members of said back support being coupled to one of said hinges at one of said opposed ends, each of said inner ends of said longitudinal rail members of said seat support being coupled to the other said pair of hinges at the other of said opposed ends, said back support being rotatable in an arc about said one hinge from an open position where said back support is coplanar with said seat support to a closed position where said back support is rotated substantially ninety degrees towards said seat support, and said seat support being rotatable in an arc about said other hinge from an open position where said seat support is coplanar with said back support to a closed position where said seat support is rotated substantially ninety degrees towards said back support.

4. The creeper of claim 3 further comprising an adjustable headrest, said headrest including:

a head support member coupled to said back support member, that is capable of supporting the weight of a human head; and an adjustor that adjusts the height and the angle of inclination of said head support relative to said back supporting member.

5. A foldable creeper that is capable of supporting a person comprising:

a back support including a pair of spaced apart, longitudinally oriented, opposed substantially parallel, rail members that are coupled together, each of said back support rail members having an inner end and an outer end, each of said inner ends of the back support rail members being indented with respect to their outer ends, and at or near each of the outer ends of the back support rail members a caster attached thereto, a seat support including a pair of spaced apart, longitudinally oriented, opposed substantially parallel, rail members that are coupled together, each of said seat support rail members having an inner end and an outer end, each of said inner ends of the seat support rail members being indented with respect to their outer ends, and at or near each of the outer ends of the seat support rail members a caster wheel attached thereto, said inner ends of the back support rail members being aligned and juxtaposed with inner ends of the seat support rail members, a first connector attaching one juxtaposed inner end of one back support rail member to the aligned juxtaposed inner end of one seat support rail member, and a second connector attaching one juxtaposed inner end of the other back support rail member to the aligned juxtaposed inner end of the other seat support rail member, said first and second connectors being pivotably attached to the inner ends to enable the back support and seat support to be folded inward towards each other and outward into a substantially common plane, and each said first and second connector including a caster that is positioned between the back support and seat support when folded inward towards each other.

6. A folding creeper comprising:

a seat support having an inner end and an outer end including at least one caster wheel, a back support having an inner end and an outer end and including at least one caster wheel, said seat and back supports being aligned longitudinally with their respective inner ends being attached by a hinge assembly including a caster wheel, said hinge assembly enabling the seat and back supports to be manually moved between an open position and a closed position, and a lock connected to the hinge assembly having a lock position that retains the seat and back supports coplanar when the creeper is in the open position and an unlock position that enables the seat and back supports to be manually moved into a closed position, said lock including a plate member that is fastened to the hinge assembly in a manner enabling said plate member to be loosened and tightened, when said plate member is tightened and in the locked position, said plate overlaps the inner ends of the seat and back supports to maintain the seat support and the back support substantially coplanar, and when said plate member is loosened and rotated, the seat support and the back support are enabled to be manually moved into substantially parallel planes.

* * * * *